US009126842B2

(12) United States Patent
Forsyth et al.

(10) Patent No.: US 9,126,842 B2
(45) Date of Patent: Sep. 8, 2015

(54) WATER TREATMENT

(75) Inventors: Alastair James Forsyth, Roodekrans (ZA); John Arthur Bewsey, Cape Town (ZA)

(73) Assignee: Trailblazer Technologies (PTY) LTD, Roodekrans (ZA)

( * ) Notice: Subject to any disclaimer, the term of this patent is extended or adjusted under 35 U.S.C. 154(b) by 303 days.

(21) Appl. No.: 13/876,445

(22) PCT Filed: Sep. 28, 2011

(86) PCT No.: PCT/IB2011/054264
§ 371 (c)(1),
(2), (4) Date: May 30, 2013

(87) PCT Pub. No.: WO2012/042483
PCT Pub. Date: Apr. 5, 2012

(65) Prior Publication Data
US 2014/0186242 A1    Jul. 3, 2014

(30) Foreign Application Priority Data

Sep. 28, 2010  (ZA) .................................. 2010/06880
Sep. 28, 2010  (ZA) .................................. 2010/06881
May 24, 2011   (ZA) .................................. 2011/03782

(51) Int. Cl.
*C01D 9/04* (2006.01)
*C02F 1/42* (2006.01)
(Continued)

(52) U.S. Cl.
CPC ............... *C01D 9/04* (2013.01); *B01J 49/0008* (2013.01); *B01J 49/0013* (2013.01);
(Continued)

(58) Field of Classification Search
None
See application file for complete search history.

(56) References Cited

U.S. PATENT DOCUMENTS 2,157,260 A     5/1939  Dessevre ....................... 423/397
3,472,618 A  * 10/1969  Every et al. ................... 423/545
(Continued)

FOREIGN PATENT DOCUMENTS

JP    2009269800 A  * 11/2009
RU      2106316 C1  *  3/1998
(Continued)

OTHER PUBLICATIONS

International Preliminary Report on Patentability issued by the International Bureau on Apr. 2, 2013 for International Application No. PCT/IB2011/054264 filed Sep. 28, 2011 and published as WO 2012/042483 on Apr. 5, 2012 (Applicant—Trailblazer Technologies (PTY) Ltd.; Inventors—Forsyth, et al.) (6 pages).
(Continued)

*Primary Examiner* — Melissa Swain
(74) *Attorney, Agent, or Firm* — Ballard Spahr LLP

(57) ABSTRACT

The invention provides a method of reducing the sodium content of a water containing dissolved sodium ions, particularly a water with a sodium ion content of at least 100 ppm. Examples of such waters are effluents such as acid mine drainage and river waters. The method includes the steps of:
(i) removing sodium, calcium and magnesium ions from the water by contacting the water with a cation exchange resin/s to capture sodium, calcium and magnesium ions thereon,
(ii) treating the cation exchange resin/s of step (i) with nitric acid to produce an eluant containing sodium ions, calcium ions, magnesium ions nitrate ions and nitric acid, (iii) adding a carbonate to the eluant to precipitate the calcium and magnesium ions as calcium and magnesium carbonates;
(iv) separating the precipitated carbonates from the eluant; and
(v) treating the eluant from step (iv) to obtain a sodium and/or potassium nitrate product.

21 Claims, 3 Drawing Sheets

(51) Int. Cl.
  *C05C 5/02* (2006.01)
  *C05D 3/02* (2006.01)
  *C05D 5/00* (2006.01)
  *B01J 49/00* (2006.01)
  *C02F 1/52* (2006.01)
  *C02F 5/00* (2006.01)
  *C02F 101/10* (2006.01)
  *C02F 101/12* (2006.01)
  *C02F 101/20* (2006.01)
  *C02F 103/00* (2006.01)
  *C02F 103/10* (2006.01)
  *C02F 1/04* (2006.01)

(52) U.S. Cl.
  CPC ......... *B01J 49/0069* (2013.01); *B01J 49/0073* (2013.01); *C02F 1/42* (2013.01); *C05C 5/02* (2013.01); *C05D 3/02* (2013.01); *C05D 5/00* (2013.01); *C02F 1/04* (2013.01); *C02F 1/5236* (2013.01); *C02F 5/00* (2013.01); *C02F 2001/422* (2013.01); *C02F 2001/425* (2013.01); *C02F 2001/5218* (2013.01); *C02F 2101/10* (2013.01); *C02F 2101/101* (2013.01); *C02F 2101/12* (2013.01); *C02F 2101/20* (2013.01); *C02F 2103/007* (2013.01); *C02F 2103/10* (2013.01); *C02F 2303/16* (2013.01); *Y02W 10/37* (2015.05)

(56) References Cited

U.S. PATENT DOCUMENTS

2009/0039027 A1  2/2009  Van Niekerk et al.
2009/0056707 A1  3/2009  Foody et al. .................... 127/36

FOREIGN PATENT DOCUMENTS

WO  WO-2006/101881 A1  9/2006
ZA  68/2682  5/1968

OTHER PUBLICATIONS

International Search Report mailed by the International Bureau on Dec. 12, 2011 for International Application No. PCT/IB2011/054264 filed Sep. 28, 2011 and published as WO 2012/042483 on Apr. 5, 2012 (Applicant—Trailblazer Technologies (PTY) Ltd.; Inventors—Forsyth, et al.) (4 pages).

Written Opinion mailed by the International Bureau on Dec. 12, 2011 for International Application No. PCT/IB2011/054264 filed Sep. 28, 2011 and published as WO 2012/042483 on Apr. 5, 2012 (Applicant—Trailblazer Technologies (PTY) Ltd.; Inventors—Forsyth, et al.) (5 pages).

Production Process: Caliche. http://www.sqm.com/en-us/acercadesqm/recursosnaturales/caliche.aspx. (2011) SQM Website.

Selective Solvent Precipitation Separates Inorganic Salts. (1967) Chemical Processing.

* cited by examiner

WATER TREATMENT

CROSS REFERENCE TO RELATED APPLICATIONS

The present application is a National Phase Application of International Application No. PCT/IB2011/054264, filed Sep. 28, 2011, which claims priority to South African Patent Applications No. 2010/06880, filed Sep. 28, 2010; South African Patent Applications No. 2010/06881, filed Sep. 28, 2010; and South African Patent Applications No. 2011/03782, filed May 24, 2011, which applications are incorporated herein fully by this reference.

BACKGROUND OF THE INVENTION

This invention relates to water treatment.

The pollution of water is a major problem around the world. The treatment of polluted water to render it potable or better able to be used in agriculture presents a major challenge.

Water is polluted in many ways. The mining industry is responsible for significant pollution of water which must be treated before it is discharged into the river systems. One of the ways water is polluted is as a result of water seeping into old, disused mine shafts. On passage through the rock, the water dissolves sulphides present in the rock producing sulphuric acid. The water which seeps into the old, disused mine shafts contains sulphuric acid and dissolved salts and can have a pH as low as 3. The mine shafts fill with the acidic water. Underground water sources are polluted with this acidic water. The shafts eventually fill with this acidic water and then the water overflows into the above-ground water ways causing serious problems. This acidic water is known as acid mine drainage (AMD), an acidic effluent of the mining industry.

AMD can be treated by reverse osmosis. Although reverse osmosis provides a very pure water product, it also produces a brine which is waste product containing significant amounts of dissolved salts of cations such as sodium, potassium, calcium, magnesium and the like salts. The brine needs to be disposed of.

Pollution of water is not only caused by human activity. Water which falls on the mountains of South Africa is pure. However, on passage down to the coast the water contacts rock and other formations and some of the minerals contained in these formations dissolves in the water. Thus, some of the water in South African rivers contain significant quantities of dissolved salts. An example of this is the water in the Sundays river. This water contains significant quantities of dissolved sodium, chloride and sulphate ions. The Sundays river water is used to irrigate crops such as citrus orchard. The dissolved ions in the water have the effect of reducing the yields obtainable from citrus trees.

SUMMARY OF THE INVENTION

According to a first aspect of the invention, there is provided a method of treating a water containing dissolved sodium, calcium and magnesium ions including the steps of:
(i) removing sodium, calcium and magnesium ions from the water by contacting the water with a cation exchange resin/s to capture sodium ions thereon,
(ii) treating the cation exchange resin/s of step (i) with nitric acid to produce an eluant containing sodium ions, calcium ions, magnesium ions nitrate ions and nitric acid,
(iii) adding a carbonate to the eluant to precipitate the calcium and magnesium ions as calcium carbonate and magnesium carbonate;
(iv) separating the precipitated carbonates from the eluant; and
(v) treating the eluant from step (iv) to obtain a sodium and/or potassium nitrate product.

The invention reduces the sodium, calcium and magnesium content of the water and, at the same time, produces a sodium and/or potassium nitrate of high purity, a product of commercial value.

The precipitated carbonates, a mixture of calcium and magnesium carbonates, produced at step (iii), also known as dolomite, may be recovered by filtration in a pure form. Dolomite is useful in agricultural and paper-making applications.

In one embodiment of the invention, sodium carbonate is added at step (iii), and the treatment of step (v) includes the step of recovering precipitated sodium nitrate crystals from the eluant, typically by evaporation water from the eluant.

In a preferred embodiment of the invention, the treatment of the eluant in step (v) includes the steps of:
(vi) adding a potassium chloride to the eluant,
(vii) treating the eluant of step (iii) to cause sodium ions in the eluant to crystallize as a sodium chloride,
(viii) separating the crystallised sodium chloride from the eluant of step (iv) to produce crystals of the sodium chloride and an eluant containing potassium nitrate in solution, and
(ix) recovering potassium nitrate from the eluant of step (v).

The carbonate in this form of the invention may be sodium or potassium carbonate and is preferably potassium carbonate. When the carbonate is potassium carbonate, it is preferably from an organic source of ash, for example ash from sunflower seed residue from vegetable oil expression, or ash from timber residues, preferably palm bunch ash which has a potassium carbonate content of 60%-80%, by weight.

The potassium chloride added to the eluant in step (vi) is preferably added in an equimolar amount to the sodium nitrate in solution in the eluant.

In step (vii), the preferred method of causing the sodium chloride to precipitate is by heating the eluant and removing water from the eluant to cause the sodium chloride to crystallize selectively out of the eluant. The temperature to which the eluant is heated will typically be in the range 80 to 110° C., preferably 85 to 110° C. The water will generally be removed by evaporation in an evaporator.

The potassium nitrate will preferably be recovered in step (ix) by cooling, crystallization and separation of the crystals from the eluant. The recovered product is a high quality potassium nitrate, containing 98-99% by weight potassium nitrate.

Preferably, the cation exchange resin on which the magnesium and calcium ions are captured is the same as that on which the sodium ions are captured.

In another embodiment of the invention, the water also contains chloride and sulphate ions and at least some of these ions are removed from the water by contacting the water with an anion exchange resin.

Preferably, the anion exchange resin is treated with ammonia to produce an anion exchange eluant containing ammonium sulphate and ammonium chloride, which may be contacted with an alcohol to cause the ammonium sulphate to precipitate and separating the precipitated ammonium sulphate from the anion exchange eluant.

The alcohol may be methanol or ethanol.

The method of the present invention is particularly suitable for treating a water contains at least 100 ppm, preferably at least 300 ppm up to 1000 ppm, of sodium ions.

The water may be river water, underground water, or an effluent such as acid mine drainage.

The water may contain dissolved heavy metals, e.g. when the water is AMD. The heavy metals may be removed from the water by ion exchange or by precipitation on aeration and pH adjustment, prior to removal of sodium ions from the water.

DESCRIPTION OF PREFERRED EMBODIMENTS

This invention, in its broadest aspect, relates to the treatment of water which contains dissolved sodium, calcium and magnesium ions. The water will generally contain at least 100 ppm of sodium ions and more generally at least 300 ppm of sodium ions. Examples of waters which can be treated by the method of the invention are effluents, particularly acidic effluents such as AMD, river waters and other polluted waters and effluents. In many AMD waters the sodium ion content is in the range 500 ppm to 1000 ppm, especially from 700 to 1000 ppm, for example AMD from a coal mine. The typical pH of an AMD is 2 to 8. The water may thus be an acid effluent such as AMD, river water, brine from a reverse osmosis treatment of AMD or other such effluent. These waters also contain dissolved calcium and magnesium ions and also sulphates and chlorides. The invention provides for a method of treating these waters to reduce the levels of these dissolved ions resulting in water being produced which is potable and/or capable of being used in agriculture, and also to provide a commercially significant product: sodium and/or potassium nitrate.

In what follows an embodiment of the invention will be described with reference to FIGS. 1 to 3. The water chosen for this embodiment is AMD. However, the embodiment is equally applicable to the treatment of other waters such as river waters that have a high sodium and chloride content.

Figure 1:
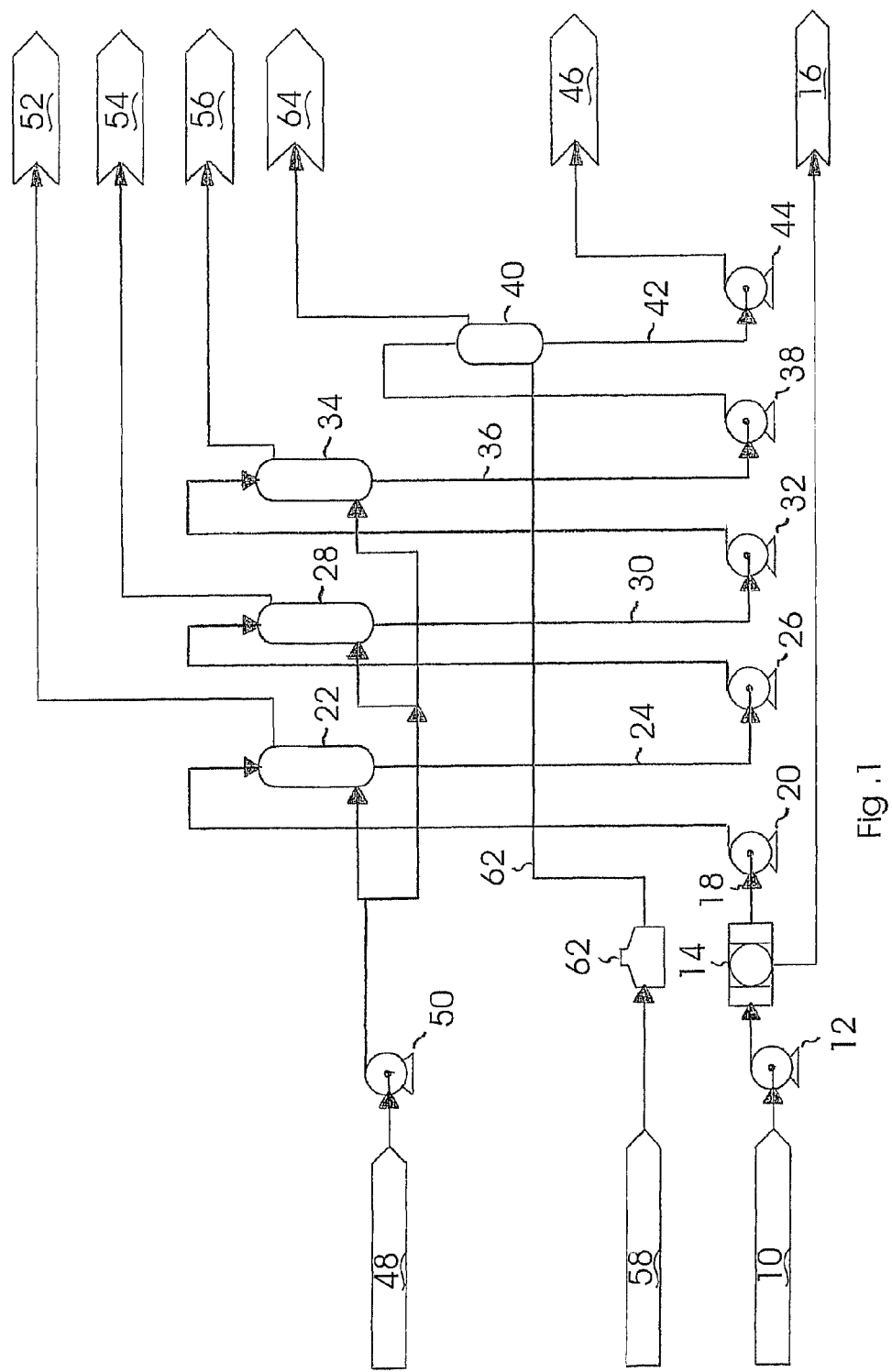
FIG. 1 is a flow diagram of a process of the invention for treating AMD to provide an environmentally acceptable water product and a solution containing $Na^+$ and $K^+$ cations, nitrate ions and nitric acid.

With reference to FIG. 1, an acid mine drainage (AMD) 10 containing $Na^+$, $K^+$, $Mg^{2+}$, $Ca^{2+}$, $SO_4^{2-}$ and $Cl^-$ ions and possibly heavy metals such as uranium, radium, iron, nickel, cobalt, copper, manganese is pumped via a pump 12 through a filter 14 to separate silt 16 from the AMD to provide filtered AMD 18.

The filtered AMD 18 is pumped by a pump 20 to a heavy metal ion exchange column 22. The heavy metal ion exchange column 22 contains a cation or anion exchange resin adapted to capture metals such as uranium, radium, iron, nickel, cobalt, copper, manganese are extracted onto the resin and an effluent stream (eluant) 24 exits the column 22.

The effluent stream 24 is pumped by a pump 26 to a first cation exchange column 28, containing a strong cation exchange resin adapted to capture bivalent cations. The first cation exchange column captures bivalent cations, namely $Ca^{2+}$ and $Mg^{2+}$, and an effluent 30 stream exits the first cation exchange column 28.

The effluent stream 30 is pumped by pump 32 to a second cation exchange column 34. The second cation exchange column 34 contains a strong cation exchange resin adapted to capture monovalent cations, namely $K^+$ and $Na^+$, and an effluent stream 36 exits the second cation exchange column 34.

In a preferred form of the invention, the cation exchange resins 28 and 34 are combined into a single cation exchange resin column which captures both the monovalent cations and the bivalent cations.

The effluent stream 36 from the second cation exchange column 34 (or single cation exchange resin column which captures both the monovalent and bivalent cations) is pumped by a pump 38 to an anion exchange column 40. The anion exchange column 40 contains an anion exchange resin adapted to capture $SO_4^{2-}$ and $Cl^-$ anions, to obtain an effluent stream 42 which is pumped by a pump 44 to provide an environmentally acceptable water 46 with a pH of 7 to 8.

The cation exchange resin may be a strongly acidic, gelular cation exchange resin with beads of uniform size (monodisperse) based on a styrene-divinylbenzene copolymer, for example Amberlite 252RF-H available from Rohm & Haas. The anion exchange resin may be a weakly basic ion exchange resin, for example Amberlite IRA 67 RF available from Rohm & Haas.

The heavy metal extraction column 22, first cation exchange column 28 and second cation exchange column 34 are regenerated with a 20% nitric acid solution 48 which is pumped via a pump 50.

Regeneration of the heavy metal extraction column 22 using nitric acid 48 provides a solution 52 containing heavy metal nitrates. The heavy metals may be reclaimed from this solution as a product.

Regeneration of the first cation exchange column 28 with nitric acid 48 provides a solution 54 containing predominantly calcium nitrate and magnesium nitrate.

Regeneration of the second cation exchange column 34 with nitric acid 48 provides a solution 56 containing essentially sodium nitrate and potassium nitrate, as well as calcium and magnesium ions. The calcium and magnesium ions are removed by adding sodium carbonate (soda ash), which reacts with the magnesium ions and calcium ions to form magnesium and calcium carbonate which is precipitated from solution, and removed from the eluant by filtration. A 95-99% by weight pure sodium nitrate product containing low levels of potassium nitrate may be obtained by evaporation of water from the eluant. This product may find application as part of a molten salt used in solar thermal energy technology.

The illustrated embodiment shows separate first and second cation exchange resins and separate streams of bivalent and monovalent ions. A single cation exchange resin may be used, with the bivalent ions being absorbed or captured first. The monovalent ions will be eluted first.

The solutions 54 and 56 may also be combined into a single solution of mixed bivalent and monovalent ions.

Anhydrous ammonia 58 is diluted in a vessel 60 to provide a 15% ammonium solution 62 which is used to regenerate the anion exchange column 40 to provide a solution 64 containing ammonium sulphate and ammonium chloride.

In the case of AMD from a gold mine, the AMD feed 10 may have a pH of 3, $Na^+$ content of 200 ppm, a $K^+$ content of 6 ppm, a $Mg^{2+}$ content of 160 ppm, a $Ca^{2+}$ content of 440 ppm, and $Fe^{2+}$ content of 220 ppm, a $SO_4^{2-}$ content of 1500 ppm, and $Cl^-$ content of 135 ppm.

Using the process of the invention on the above AMD from a gold mine, a water product 46 having a pH of 7, containing the following levels of ions, which is environmentally acceptable, may be obtained: $Na^+$ 60 ppm, $K^+$ 5 ppm, $Mg^{2+}$ 5 ppm, $Ca^{2+}$ 5 ppm, $Fe^{2+}$ 0.5 ppm, $SO_4^{2-}$ 150 ppm, and $Cl^-$ 135 ppm. The solution 54 will thus contain 155 ppm in $Mg^{2+}$ and 435 ppm $Ca^{2+}$. The solution 56 will contain 140 ppm $Na^+$ and 21 ppm $K^+$, and the solution 62 will contain 1350 ppm $SO_4^{2-}$ and 60 ppm $Cl^-$. The processing of 20 mega liters per day of the above AMD 10 per day will provide 3774 tpa $NaNO_3$, 394 tpa $KNO_3$, 6935 tpa $Mg(NO_3)_2$, 13016 tpa $Ca(NO_3)_2$, 1832 tpa $Fe_2O_3$, 13673 tpa $(NH_4)_2SO_4$, and 657 tpa $NH_4Cl$.

The $NaNO_3$, $KNO_3$, $Mg(NO_3)_2$ and $Ca(NO_3)_2$ may be mixed to provide a soup of mixed nitrate salts, which may conveniently be used to increase the cation blend in emulsion explosives, however the market for this product is limited. The $(NH_4)_2SO_4$ and $NH_4Cl$ may be mixed to provide a crystalline product which may be used in agriculture. Again, the market for this product is limited.

AMDs from some coal mines have a much higher $Na^+$ content than that from gold mines, for example the $Na^+$ content from a coal mine may be above 500 ppm, typically from 700 to 1000 ppm. Thus, AMD from a coal mine may have a pH of 4, a $Na^+$ content of 800 ppm, a $K^+$ content of 10 ppm, a $Mg^{2+}$ content of 50 ppm, a $Ca^{2+}$ content of 60 ppm, a $SO_4^{2-}$ 1200 ppm, and $Cl^-$ content of 240 ppm. When this AMD 10 is passed through the process described with reference to FIG. 1, a water product 46 containing the following levels of ions, which is environmentally acceptable, may be obtained: $Na^+$ 60 ppm, $K^+$ 5 ppm, $Mg^{2+}$ 5 ppm, $Ca^{2+}$ 55 ppm, $SO_4^{2-}$ 150 ppm, and $Cl^-$ 75 ppm. Regeneration of the cation exchange columns with nitric acid and regeneration of the anion exchange column with ammonium solution will provide:

The solution 54 with 45 ppm in $Mg^{2+}$ and 5 ppm $Ca^{2+}$, i.e. 275 ppm $Mg(NO_3)_2$ and 20 ppm $Ca(NO_3)_2$ The solution 56 with 740 ppm $Na^+$ and 5 ppm $K^+$, i.e. 2734 ppm $NaNO_3$ and 12 ppm $KNO_3$ The solution 62 with 1050 ppm $SO_4^{2-}$ and 165 ppm $Cl^-$ i.e. 1457 ppm $(NH_4)_2SO_4$ and 248 ppm $NH_4Cl$ The processing of 16 mega liters per day of the above AMD 10 per day and regeneration of the cation exchange columns with nitric acid and regeneration of the anion exchange column with ammonia solution will provide 15967 tpa $NaNO_3$, 70 tpa $KNO_3$, 1606 tpa $Mg(NO_3)_2$, 117 tpa $Ca(NO_3)_2$, 8509 tpa $(NH_4)_2SO_4$, and 1448 tpa $NH_4Cl$.

The ammonium sulphate and ammonium chloride can be used, as with the acid water from the gold mines, to form an agricultural solid as described above.

However, the sodium content of the solution 56 is too high for the products of the process of the invention to be used in emulsion explosives compositions due to the lower solubility of sodium nitrate compared to that of calcium nitrate and will precipitate out at the high concentrations needed for this purpose.

Figure 2:
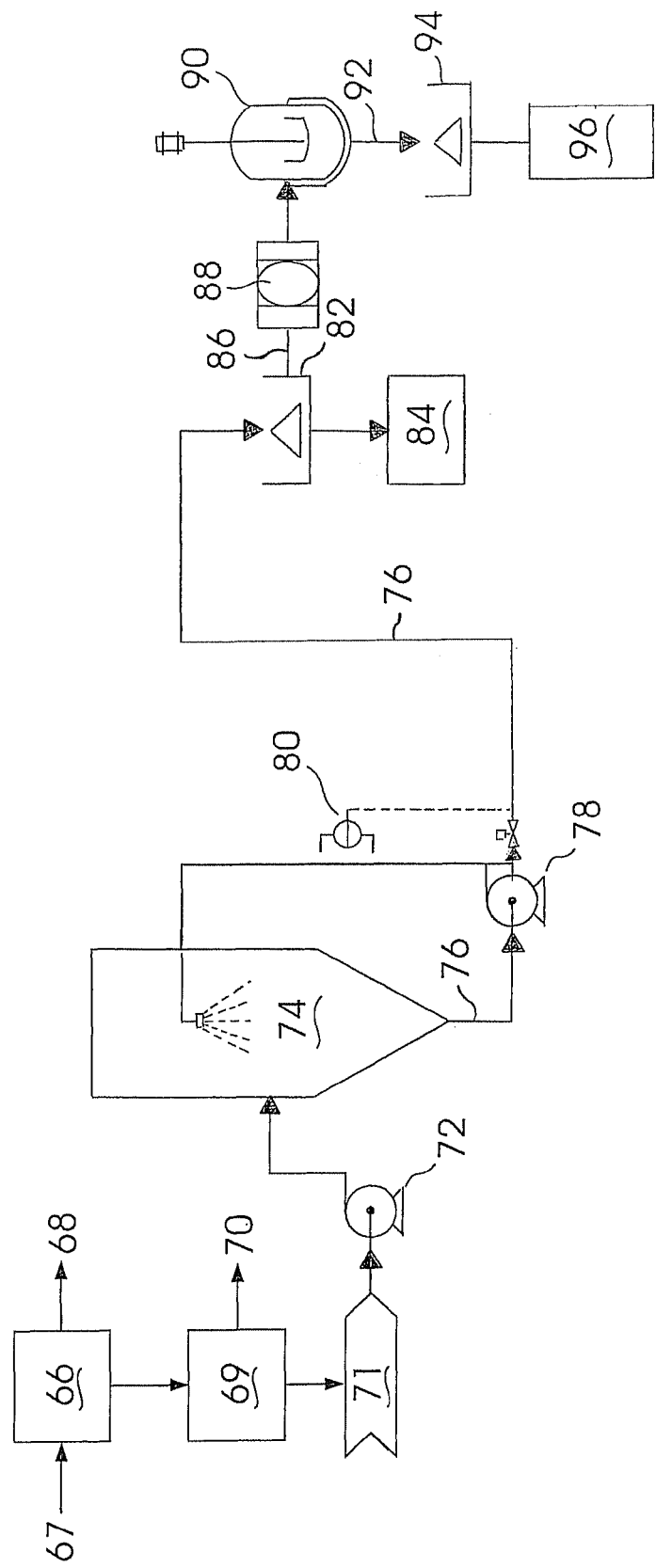
FIG. 2 is a flow diagram of a process of the invention for obtaining a potassium nitrate product from the solution containing $Na^+$ and $K^+$ cations, nitrate ions and nitric acid of FIG. 1.
Figure 3:
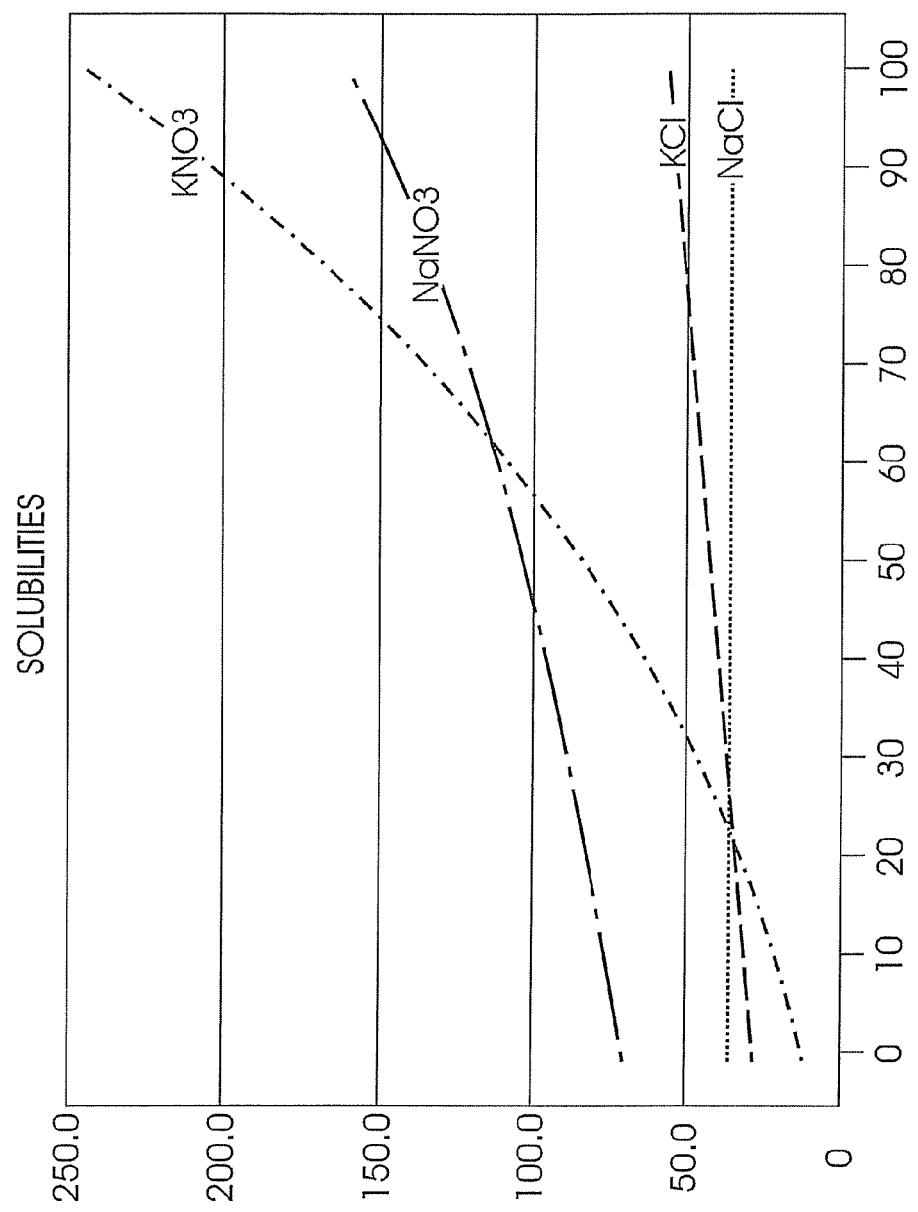
FIG. 3 is a graph showing the solubilities of potassium nitrate, sodium nitrate, potassium chloride and sodium chloride.

With reference to FIG. 2, the solution 56 or a mixture of solutions 54 and 56 having a tds content of 27.9% and containing $Ca^{2+}$, $Mg^{2+}$, $Na^+$, $K^+$, $NO_3^-$ and $Cl^-$ ions is provided as a feed solution 66.

In one embodiment of the invention, sodium carbonate 67 is added to the feed solution 66. This causes magnesium and calcium carbonates to form and precipitate, producing a slurry of the precipitated carbonate salts. The slurry may be passed to a centrifuge to separate the precipitated mixed magnesium and calcium carbonates 68. The mixed carbonates 68, known as dolomite, is a product useful in the agricultural industry. The dolomite may have a purity of from 95 to 99% by weight. After separation, a solution 69 having a pH of 7 to 8 containing mainly sodium nitrate ions, and low levels of potassium nitrate ions is obtained, which may be evaporated to obtain a pure product 70 containing 95 to 99% by weight sodium nitrate, and low levels of potassium nitrate. This product may find application as part of a molten salt used in solar thermal energy technology.

In a preferred embodiment of the invention, potassium carbonate 67 is added to the feed solution 66. The preferred potassium carbonate comes from organic ash, i.e. ash that is left from the burning of organic residue, for example palm bunch ash, which is the ash that is left from the burning of the organic residue from pressing palm oil from the fruit of the palms grown in vast amounts in Indonesia and thereabouts. This palm ash contains up to 80% by weight potassium carbonate with a small amount of phosphate and mainly benign material. The use of palm ash has an economic benefit over sodium carbonate (soda ash), creating the equivalent amount of potassium nitrate to the calcium and magnesium present, and supplying all the carbonate needed to precipitate the Ca and Mg at a significantly reduced cost. Most organic materials will produce a suitable ash when burnt and large enough supplies come from sunflower seed residue from vegetable oil expression and timber residues that have to be burnt to prevent accumulation of a large fire hazard when stored. The addition of potassium carbonate 67 causes magnesium and calcium carbonates to form and precipitate, producing a slurry of the precipitated carbonate salts. The slurry may be passed to a centrifuge to separate the precipitated mixed magnesium and calcium carbonates 68. The mixed carbonates 68, known as dolomite, is a product useful in the agricultural industry. In the case where palm ash is added, the dolomite may have a purity of from 50 to 80% by weight which is a lower quality than if pure potassium carbonate is used due to the ash content of the palm ash still being present. This product can still be useful as an agricultural soil ameliorant. After separation, a solution 69 having a pH of 7 to 8 containing sodium, potassium and nitrate ions is the feed solution 71 containing $Na^+$ and $K^+$ cations, nitrate ions and nitric acid has a total dissolved solids (tds) content of 20% (typically the solution will comprise 10% sodium nitrate and 10% potassium nitrate). The solution is maintained at room temperature and atmospheric pressure and solid potassium chloride is added in an equimolal amount to sodium nitrate. The resulting solution has a tds content of 27.9%. This feed solution is pumped by a pump 72 to a crystallizer evaporator 74 where the solution is maintained at boiling point to provide a concentrated solution 76 with a tds content of 69% and also containing a slurry of sodium chloride crystals. The sodium chloride crystals crystallize out selectively due to the difference in solubilities of potassium nitrate and sodium chloride, as show in FIG. 3.

The concentrated slurry solution 76 is pumped by a pump 78 through a coriolis density controller 80 to maintain the concentration at the required concentration, and on to a centrifuge 82 which separates out sodium chloride crystals 84 which are washed to provide a good quality sodium chloride product. From the centrifuge 82, a hot solution 86 containing $Na^+$, $K^+$, $NO_3^-$ and $Cl^-$ ions is passed through a filter 88 and introduced to a cooled crystallizer 90 where a good grade of potassium nitrate crystallizes from the solution at 30° C. The filter 88 is used to separate out all insoluble impurities before final crystallization of the product occurs. A solution 92 from the cooled crystallizer 90 containing crystallized potassium nitrate is introduced to a centrifuge 94 from which a solid potassium nitrate product 96 is obtained. This product potassium nitrate will have a maximum impurity of about 2% sodium chloride, i.e. it will have a potassium nitrate purity of 98-99% by weight. If a totally pure potassium nitrate product is required it may be recrystallized in fresh water. The sodium chloride containing mother liquor may be returned to the feed solution 70.

Advantages of the present invention include:
low operating costs compared to reverse osmosis technologies; the provision of useful products, particularly potassium nitrate and dolomite, instead of waste products;
value base metals (if present) may be recovered;
an environmentally acceptable water product is obtained;
the operation of the process is simple;
raw materials for the process are easily available.

An embodiment of the invention has been described with reference to the treatment of AMD. The process described and illustrated above is equally applicable to the treatment of other waters and effluents. For example, the process can be used to treat water from the Sundays river and water from a commercial waste processing site, which have the following analyses:

| SUNDAY'S RIVER | | | |
| --- | --- | --- | --- |
| | Min | Max | Mean |
| SODIUM | 4 | 447 | 140 |
| POTASSIUM | 0 | 22 | 5 |
| MAGNESIUM | 1 | 92 | 26 |
| CALCIUM | 2 | 96 | 40 |
| SULFATE | 2 | 337 | 93 |
| CHLORIDE | 10 | 723 | 136 |

| WASTE SITE | | | |
| --- | --- | --- | --- |
| | Min | Max | Mean |
| SODIUM | 30000 | 47000 | 38000 |
| POTASSIUM | 2000 | 5000 | 3500 |
| MAGNESIUM | 100 | 300 | 200 |
| CALCIUM | 20 | 50 | 35 |
| SULFATE | 26000 | 43000 | 35000 |
| CHLORIDE | 28000 | 41000 | 35000 |

The invention claimed is:

1. A method of treating a water containing dissolved sodium, calcium and magnesium ions including the steps of:
   (i) removing sodium, calcium and magnesium ions from the water by contacting the water with a cation exchange resin(s) to capture sodium, calcium and magnesium ions thereon, wherein the cation exchange resin(s) on which the calcium and magnesium ions are captured is the same as on which the sodium ions are captured,
   (ii) treating the cation exchange resin(s) of step (i) with nitric acid to produce an eluant containing sodium ions, calcium ions, magnesium ions, nitrate ions and nitric acid,
   (iii) adding potassium carbonate or sodium carbonate to the eluant to precipitate the calcium and magnesium ions as calcium carbonate and magnesium carbonate;
   (iv) separating the precipitated carbonates from the eluant; and
   (v) treating the eluant from step (iv) to obtain a sodium and/or potassium nitrate product, wherein the treatment of the eluant in step (v) includes the steps of:
   (vi) adding potassium chloride to the eluant of step (v),
   (vii) treating the eluant of step (vi) to cause sodium ions in the eluant to crystallize as sodium chloride,
   (viii) separating the crystallised sodium chloride from the eluant of step (vii) to produce crystals of the sodium chloride and an eluant containing potassium nitrate in solution, and
   (ix) recovering potassium nitrate from the eluant of step (viii).

2. The method as claimed in claim 1, wherein precipitated calcium and magnesium carbonates produced at step (iii) is recovered by filtration.

3. The method according to claim 1 wherein potassium carbonate is added in step (iii).

4. The method as claimed in claim 3, wherein the potassium carbonate added at step (iii) is from an organic source of ash.

5. The method as claimed in claim 4, wherein the organic source of ash is ash from sunflower seed residue, from vegetable oil expression, ash from timber residues, or palm bunch ash.

6. The method as claimed in claim 5, wherein the organic source of ash is palm bunch ash which has a potassium carbonate content of 60%-80%, by weight.

7. The method as claimed in claim 1, wherein the potassium chloride added to the eluant in step (vi) is added in an equimolar amount to the sodium nitrate in solution in the eluant.

8. The method as claimed in claim 1, wherein, in step (vii), the method of causing the sodium ions to crystallize is by heating the eluant and removing water from the eluant to cause the sodium salt to crystallize selectively out of the eluant.

9. The method as claimed in claim 8, wherein the temperature to which the eluant is heated is in the range from 80 to 110° C.

10. The method as claimed in claim 9, wherein the temperature to which the eluant is heated is in the range from 85 to 110° C.

11. The method as claimed in claim 9, wherein the water is removed from the eluant by evaporation in an evaporator.

12. The method as claimed in claim 1, wherein potassium nitrate is recovered in step (ix) by cooling, crystallization and separation of the crystals from the eluant.

13. The method as claimed in claim 1, wherein the potassium nitrate recovered in step (ix) contains 98-99% by weight potassium nitrate.

14. The method as claimed in claim 1, wherein the water also contains chloride and sulphate ions and at least some of these ions are removed from the water by contacting the water with an anion exchange resin.

15. The method as claimed in claim 14, wherein the anion exchange resin is treated with ammonia to produce an anion exchange eluant containing ammonium sulphate and ammonium chloride.

16. The method as claimed in claim 15, wherein the eluant containing ammonium sulphate and ammonium chloride is contacted with an alcohol to cause the ammonium sulphate to precipitate and separating the precipitated ammonium sulphate from the anion exchange eluant.

17. The method as claimed in claim 16, wherein the alcohol is methanol or ethanol.

18. The method as claimed in claim 1, wherein the water contains at least 100 ppm of sodium ions.

19. The method as claimed in claim 18, wherein the water contains at least 300 ppm up to 1000 ppm, of sodium ions.

20. The method as claimed in claim 1, wherein the water is river water, underground water, or an effluent.

21. The method as claimed in claim 20, wherein the effluent is acid mine drainage.

* * * * *